Aug. 18, 1959  R. M. RULON ET AL  2,900,545
CURVED ELECTROLUMINESCENT LAMP
Filed July 21, 1953
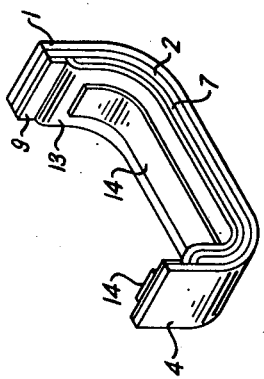
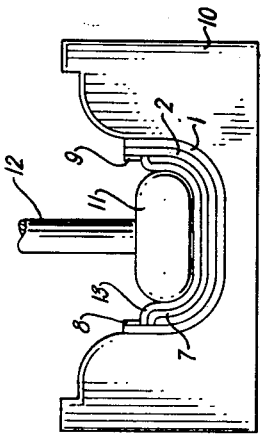
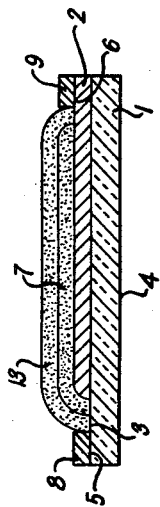
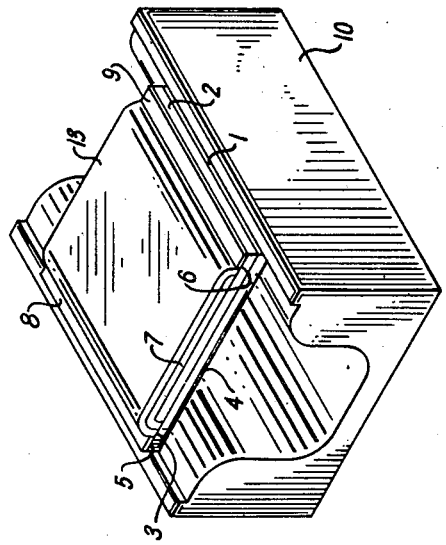
INVENTORS
WILLARD H. DREW
RICHARD M. RULON
BY
ATTORNEY United States Patent Office 2,900,545
Patented Aug. 18, 1959

2,900,545
CURVED ELECTROLUMINESCENT LAMP

Richard M. Rulon, Wenham, and Willard Henry Drew, Peabody, Mass., assignors, by mesne assignments, to Sylvania Electric Products Inc., Wilmington, Del., a corporation of Delaware Application July 21, 1953, Serial No. 369,344

3 Claims. (Cl. 313—108)

This invention relates to electroluminescent lamps, and particularly to lamps of that type having curved surfaces, and to methods of making the same.

Electroluminescent lamps with curved surfaces can be used in signal lighting, in film viewers and in many other applications.

Heretofore such lamps with curved surfaces have not been used because of the difficulty of providing an extremely thin and uniform layer of phosphor and dielectric on the curved surface. When such a layer was applied by spraying, flowing or the like, the material applied would tend to collect in a thicker layer at the bottom of the piece, because of its curvature. Since the layer is only a few thousandths of an inch thick, any great variation in thickness from spot to spot will be damaging to the lamp, facilitating breakdown of the dielectric at the thinner areas, or producing a serious decrease in brightness at the thicker areas.

We have discovered that if the glass base plate of the lamp is coated with its transparent conductive coating, and a coating of a suspension of powdered ceramic and phosphor applied over it and dried, the coated glass plate can then be heated and bent into the desired shape, the heating serving both to allow bending of the glass and to melt the powdered ceramic, fusing the latter onto the plate. A conductive coating can then be applied to the ceramic-phosphor layer, thus providing a conductive coating on each side of said layer.

We have discovered that the ceramic-phosphor layer protects the first conductive coating, which is on the glass, during the heating. The conductivity of the coating would be seriously impaired if the heat were applied in the absence of the ceramic-phosphor powder.

Other objects, features and advantages of the invention will be apparent from the following specification, taken in connection with the accompanying figures, in which Fig. 1 shows a coated and heated glass plate in position for being pressed into a mold; Fig. 2 shows the plate pressed into the mold; Fig. 3 shows the resultant curved lamp after having been taken from the mold, cut to a shorter width and given an additional conductive coating; and Fig. 4 is a schematic cross-section of the coated glass plate of Fig. 1.

In one embodiment of the invention as shown in Fig. 1, a flat piece of glass 1 was coated with a transparent conductive material to form a conductive coating 2, a portion of which along one edge being removed therefrom to leave a non-conductive area 3 about a quarter inch wide. The glass was then thoroughly washed with an alkaline cleaner such as a dilute solution of tri-sodium phosphate, rinsed with distilled water, and dried.

The glass was then coated by dipping it into a suspension composed of about 100 parts by weight of powdered ceramic material (200 mesh or finer) and 40 parts by weight of a green electroluminescent powder dispersed in a mixture of about 90% isopropyl alcohol and 10% water.

The coated glass was dried in an oven at 150° C. for 5 to 10 minutes, and the powdered materials then removed from the non-conductive side 4 of the glass, ceramic-phosphor powder also being removed in a narrow strip from the outer edge 5 of the decoated area and from the opposite edge 6 of the coated area to a width of about one-eighth inch in each case.

After removing the powdered ceramic and phosphor mixture from the areas mentioned, a narrow strip 8 of "firing" silver ink was painted onto the exposed portion 5 of the decoated area and another strip 9 painted onto the exposed portion 6 of the conductive area of the glass. The "firing" silver was then dried for about 10 minutes at 150° C. This "firing" silver is well-known to the art for producing metallic contacts on conductive glass and ceramic articles, and can be of the type shown in copending application Serial No. 230,596 filed June 8, 1951, now abandoned, by E. F. Lowry, K. H. Butler and E. L. Mager.

After the "firing" silver was dried, the glass was placed with its coated side up on a fired talc mold 10 to about 12½" long and having a trough, roughly semicircular in cross section, ½" deep and 1" wide at the surface of the mold and extending lengthwise of the mold. The mold and piece of glass was placed in a furnace at a temperature of about 740° C. for a time of about 5 minutes.

During this period, the ceramic coating material fused to form a smooth uniform layer 7 with particles of phosphor embedded therein, the "firing" silver 8, 9 fused and bonded to the glass and the glass sagged to some extent into the mold 10 but did not by any means assume the shape of the mold 10.

While the mold 10 and glass plate 1 were heating in a furnace, we heated a piece of graphitic material 11, shaped as the counterpart of the talc mold 10 and having a handle 12, to a temperature in excess of 300° C. by means of a Bunsen burner.

As soon as the ceramic layer had been fired, the talc mold 10 and glass plate 1 were removed from the furnace and the glass piece 1 pressed into the talc mold by means of the graphitic mold 11. This pressing was done within a period less than about 5 to 10 seconds after the talc mold 10 and glass plate 1 were taken from the furnace.

The coated glass piece was allowed to cool for 15-20 seconds and then moved from the mold to the surface of an insulating brick where it quickly cooled to room temperature.

After this piece of coated glass 1 cooled, a second layer 13 of powdered ceramic and phosphor was applied. This second layer 12 of ceramic and phosphor was dried and any powder from the convex side of the piece or from the silver strips was removed and the resultant piece fired for a second time at about 740° C. for 5 minutes in the talc mold.

After the latter firing, the piece was simply moved from the mold 11 to the insulating brick after a short cooling period and allowed to cool to room temperature. Pressing was not necessary.

When the coated piece of glass 1 had cooled, it was cut crosswise with a silicon carbide cutting wheel, at intervals of about ¼", to form small curved strips of coated glass. Masking tape was applied to the concave edges of the piece to a width of about $\frac{1}{32}$" and to the end of the piece bearing the silver on the conductive layer in such a manner as to cover the silver and about ⅛" of the ceramic phosphor layer at that end.

After masking the piece a vaporized aluminum layer 14 was applied to the concave surface of the piece, and an air-drying conductive silver paint applied to the decoated end of the piece at the junction of the silver strip and the vaporized aluminum film. The masking tape was then removed and an electrical potential of 600 volts 60 cycles A.C. applied across the two silver strips. The area of the ceramic-phosphor layer covered by the aluminum film 13 was made to light up to an intensity of better than 1 footlambert of light without electrical breakdown. The light was quite uniform and of a typical green color for this phosphor when used in a ceramic dielectric.

The lamp was tested for dielectric strength by raising the voltage to 750 volts with no failure occurring.

Although two layers 7, 12 of the ceramic-phosphor mixture were used in the embodiment described, one or more of different thicknesses may prove more satisfactory for other applications. Pressing may be done after the fusion of any of the ceramic layers, although it is generally most satisfactory to perform the pressing operation after the firing of the final ceramic-phosphor layer, in which case any previous firings can be done on a flat ceramic piece rather than in the mold previously described.

Additional ceramic layers free of phosphor may be used, if desired.

In the described embodiment, the ceramic-phosphor layer was applied to the conductive glass in such a manner as to be a concave surface of the glass, it may equally well be applied to a convex surface. Although the molds have been described as made of certain specific materials in the examples, other suitable materials of which many are common in the art of molding glass can be used.

Although the conductive coating 14 is a deposit of vaporized aluminum in the specific embodiment described, it can be of any other suitable metal, preferably one of good reflectivity, and can be applied by other methods such as painting or spraying. It can also be of a transparent conductive material such as used for the tin chloride coating 2, care being taken to keep the limits of the coating 14 clear of any connection to the other conductive coating 2, to prevent short-circuiting. With the transparent coating, the lamp will emit light from both sides, but if desired a white backing layer of paint, ceramic or the like may be applied over the conductive coating 14 to increase its reflectivity.

What we claim is:

1. An electroluminescent lamp comprising a glass plate having a curved surface, a light-transmitting electrically-conductive coating on said surface, a layer of phosphor embedded in ceramic over said conductive layer, and a second conductive layer over said layer of ceramic and phosphor.

2. An electroluminescent lamp comprising a glass plate, a light-transmitting electronically-conductive coating on said surface, a first layer of phosphor embedded in ceramic over said conductive layer, a second layer of phosphor embedded in ceramic over said first layer of phosphor and ceramic, and a second conductive layer over said layer of ceramic and phosphor.

3. An electroluminescent lamp comprising a transparent conductive electrode, a layer of phosphor embedded in ceramic over said conductive layer, a transparent conductive layer over said last-mentioned layer, and a white reflecting coating over said transparent conductive layer.

References Cited in the file of this patent

UNITED STATES PATENTS

| | | |
|---|---|---|
| 2,270,470 | Paddock | Jan. 20, 1942 |
| 2,470,461 | Black | May 17, 1949 |
| 2,566,349 | Mager | Sept. 4, 1951 |
| 2,689,188 | Hushley | Sept. 14, 1954 |
| 2,689,189 | Hushley | Sept. 14, 1954 |
| 2,689,190 | Hushley | Sept. 14, 1954 |
| 2,709,765 | Koller | May 31, 1955 |

OTHER REFERENCES

"Electroluminescence—A New Method of Producing Light," by E. L. Mager and C. W. Jerome, Illuminating Engineer, pp. 688–693, November 1950.

"The New Phenomenon of Electrophotoluminescence," by Prof. G. Destriau, Philosophical Magazine, Ser. 7, vol. 38, No. 285, October 1947.